United States Patent
Zhao

(10) Patent No.: US 9,955,324 B2
(45) Date of Patent: Apr. 24, 2018

(54) SMS MESSAGE PROCESSING METHOD FOR MOBILE TERMINAL AND MOBILE TERMINAL

(71) Applicant: Huawei Technologies Co., Ltd., Shenzhen (CN)

(72) Inventor: Tao Zhao, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/523,605

(22) PCT Filed: Oct. 30, 2014

(86) PCT No.: PCT/CN2014/089941
§ 371 (c)(1),
(2) Date: May 1, 2017

(87) PCT Pub. No.: WO2016/065589
PCT Pub. Date: May 6, 2016

(65) Prior Publication Data
US 2017/0325079 A1 Nov. 9, 2017

(51) Int. Cl.
*H04W 4/00* (2009.01)
*H04W 4/14* (2009.01)
(Continued)

(52) U.S. Cl.
CPC ......... *H04W 4/14* (2013.01); *H04M 1/72552* (2013.01); *H04M 2250/60* (2013.01); *H04W 88/02* (2013.01)

(58) Field of Classification Search
CPC ... H04W 4/14; H04W 88/02; H04M 1/72552; H04M 2250/60
(Continued)

(56) References Cited

U.S. PATENT DOCUMENTS

2003/0207701 A1 11/2003 Rolnik et al.
2009/0233585 A1 9/2009 Cohen
(Continued)

FOREIGN PATENT DOCUMENTS

| CN | 101038178 A | 9/2007 |
|---|---|---|
| CN | 102467318 A | 5/2012 |
| CN | 103530042 A | 1/2014 |
| CN | 103533139 A | 1/2014 |
| EP | 0748139 A2 | 12/1996 |
| EP | 0899978 A2 | 3/1999 |

OTHER PUBLICATIONS

Machine Translation and Abstract of Chinese Publication No. CN101038178, Sep. 19, 2007, 14 pages.
Machine Translation and Abstract of Chinese Publication No. CN102467318, May 23, 2012, 15 pages.
Machine Translation and Abstract of Chinese Publication No. CN103530042, Jan. 22, 2014, 7 pages.
Machine Translation and Abstract of Chinese Publication No. CN103533139, Jan. 22, 2014, 19 pages.
(Continued)

*Primary Examiner* — Marcos Batista
(74) *Attorney, Agent, or Firm* — Conley Rose, P.C.

(57) ABSTRACT

A short message service (SMS) message processing method for a mobile terminal and a mobile terminal are provided. An SMS message Favorites bar is added to an SMS message interaction interface such that when sending or receiving an SMS message, a user can tap the SMS message Favorites bar on a current user SMS message interaction interface. The method includes receiving a first touch operation on a Favorites button, obtaining a Favorite SMS message from storage space of the mobile terminal according to the first touch operation, and displaying the obtained Favorite SMS message on a touchscreen.

19 Claims, 8 Drawing Sheets

(51) Int. Cl.
*H04M 1/725* (2006.01)
*H04W 88/02* (2009.01)

(58) Field of Classification Search
USPC .......................................... 455/466; 370/370
See application file for complete search history.

(56) References Cited

U.S. PATENT DOCUMENTS

| | | | |
|---|---|---|---|
| 2010/0262928 A1* | 10/2010 | Abbott | G06F 3/04817 |
| | | | 715/769 |
| 2011/0190012 A1* | 8/2011 | Williams | H04W 4/12 |
| | | | 455/466 |
| 2013/0061266 A1 | 3/2013 | Chai et al. | |

OTHER PUBLICATIONS

Foreign Communication From a Counterpart Application, European Application No. 14904786.2, Extended European Search Report dated Jul. 7, 2017, 9 pages.

Foreign Communication From a Counterpart Application, PCT Application No. PCT/CN2014/089941, English Translation of International Search Report dated Jul. 28, 2015, 2 pages.

Foreign Communication From a Counterpart Application, PCT Application No. PCT/CN2014/089941, English Translation of Written Opinion dated Jul. 28, 2015, 6 pages.

\* cited by examiner

SMS MESSAGE PROCESSING METHOD FOR MOBILE TERMINAL AND MOBILE TERMINAL

CROSS REFERENCE TO RELATED APPLICATION

This application is a U.S. National Stage of International Patent Application No. PCT/CN2014/089941 filed on Oct. 30, 2014, which is hereby incorporated by reference in its entirety.

TECHNICAL FIELD

Embodiments of the present disclosure relate to short message service (SMS) message processing technologies for mobile terminals, and in particular, to an SMS message processing method for a mobile terminal and a mobile terminal.

BACKGROUND

With development of science and technologies, various types of mobile terminals, for example, mobile phones, have been basically popular and bring great convenience to daily life of people. A mobile phone is used as an example. A user may make a call and send and receive SMS messages using the mobile phone, or a user may use various application programs of the mobile phone. In other approaches, when a user A sends an SMS message to a user B using a mobile phone, or in a process in which a user A receives, using a mobile phone, an SMS message sent by a user B, the user A may need to view a record of historical SMS messages added to Favorites previously. In this case, the user A needs to switch the mobile phone to an SMS message Favorites interface, open an SMS message Favorites folder, and view content of a Favorite SMS message from the SMS message Favorites folder, and then make the mobile phone return to an SMS message sending interface.

It can be known from the above that, in a method for viewing a Favorite SMS message in a process of sending or receiving an SMS message, switching needs to be repeatedly performed between different user interfaces, and consequently when the Favorite SMS message is viewed, an operation process is complex.

SUMMARY

Embodiments of the present disclosure provide an SMS message processing method for a mobile terminal and a mobile terminal in order to resolve a problem of complexity of an operation process because in an existing SMS message sending or receiving process, switching needs to be repeatedly performed between user interfaces to view a Favorite SMS message.

To achieve the foregoing objective, the following technical solutions are used in the embodiments of the present disclosure.

According to a first aspect, an embodiment of the present disclosure provides an SMS message processing method for a mobile terminal, where the method is applied to an SMS message interaction interface of the mobile terminal, and the mobile terminal includes a touchscreen, where the SMS message interaction interface includes a recipient name, an SMS message text box, and an SMS message Favorites bar, and the SMS message Favorites bar includes a Favorites button, and the method includes receiving a first touch operation on the Favorites button, obtaining a Favorite SMS message from storage space of the mobile terminal according to the first touch operation, and displaying the obtained Favorite SMS message on the touchscreen.

In a first possible implementation manner of the first aspect, with reference to the first aspect, the SMS message Favorites bar is located at a top of the SMS message interaction interface, a bottom of the SMS message interaction interface, or at one side of the SMS message interaction interface.

In a second possible implementation manner of the first aspect, with reference to the first aspect or the first possible implementation manner of the first aspect, the SMS message interaction interface further includes a historical SMS message of the mobile terminal, and the historical SMS message is an SMS message received or sent by the mobile terminal before a current moment, and the method further includes receiving a second touch operation on a historical SMS message, where the second touch operation is an operation of touching the historical SMS message and dragging the historical SMS message to the SMS message Favorites bar, and marking the historical SMS message as a Favorite SMS message according to the second touch operation.

In a third possible implementation manner of the first aspect, with reference to any one of the first aspect to the second possible implementation manner of the first aspect, displaying the obtained Favorite SMS message on the touchscreen includes displaying the obtained Favorite SMS message on a Favorites interface according to a time when the SMS message is generated, a content length of the SMS message, or a recipient name corresponding to the SMS message, where the Favorites interface is a part of the SMS message interaction interface, the Favorites interface covers the SMS message interaction interface, or the Favorites interface is independent of the SMS message interaction interface.

In a fourth possible implementation manner of the first aspect, with reference to the third possible implementation manner of the first aspect, the Favorites interface includes a search box, and the method further includes obtaining information about a recipient entered to the search box, and displaying a Favorite SMS message corresponding to the recipient on the Favorites interface.

In a fifth possible implementation manner of the first aspect, with reference to any one of the first aspect to the fourth possible implementation manner of the first aspect, the Favorite SMS message is displayed on the SMS message Favorites bar in a thumbnail form, and the method further includes receiving a third touch operation on a first thumbnail on the SMS message Favorites bar, where the third touch operation is an operation of tapping the first thumbnail, and displaying complete content of an SMS message corresponding to the first thumbnail on the touchscreen according to the third touch operation.

In a sixth possible implementation manner of the first aspect, with reference to the fifth possible implementation manner of the first aspect, the method further includes receiving a fourth touch operation on a second thumbnail on the SMS message Favorites bar, where the fourth touch operation is an operation of touching the second thumbnail and dragging the second thumbnail out of the SMS message Favorites bar, deleting a Favorites identifier of an SMS message corresponding to the second thumbnail from the storage space of the mobile terminal according to the fourth touch operation, and cancelling displaying of the second thumbnail on the SMS message Favorites bar.

According to a second aspect, an embodiment of the present disclosure provides a mobile terminal, where the mobile terminal includes a touchscreen, an SMS message interaction interface of the mobile terminal includes a recipient name, an SMS message text box, and an SMS message Favorites bar, and the SMS message Favorites bar includes a Favorites button, and the mobile terminal further includes a receiving unit configured to receive a first touch operation on the SMS message button, an obtaining unit configured to obtain a Favorite SMS message from storage space of the mobile terminal according to the first touch operation received by the receiving unit, and a display unit configured to display, on the touchscreen, the Favorite SMS message obtained by the obtaining unit.

In a first possible implementation manner of the second aspect, with reference to the second aspect, the SMS message Favorites bar is located at a top of the SMS message interaction interface, a bottom of the SMS message interaction interface, or at one side of the SMS message interaction interface.

In a second possible implementation manner of the second aspect, with reference to the second aspect or the first possible implementation manner of the second aspect, the SMS message interaction interface further includes a historical SMS message of the mobile terminal, and the historical SMS message is an SMS message received or sent by the mobile terminal before a current moment. The receiving unit is further configured to receive a second touch operation on a historical SMS message, where the second touch operation is an operation of touching the historical SMS message and dragging the historical SMS message to the SMS message Favorites bar, and the mobile terminal further includes a Favorites unit configured to mark the historical SMS message as a Favorite SMS message according to the second touch operation.

In a third possible implementation manner of the second aspect, with reference to any one of the second aspect to the second possible implementation manner of the second aspect, the display unit is further configured to display the obtained Favorite SMS message on a Favorites interface according to a time when the SMS message is generated, a content length of the SMS message, or a recipient name corresponding to the SMS message, where the Favorites interface is a part of the SMS message interaction interface, the Favorites interface covers the SMS message interaction interface, or the Favorites interface is independent of the SMS message interaction interface.

In a fourth possible implementation manner of the second aspect, with reference to the third possible implementation manner of the second aspect, the Favorites interface includes a search box, and the receiving unit is further configured to obtain information about a recipient that is entered to the search box, and the display unit is further configured to display an SMS message corresponding to the recipient on the Favorites interface.

In a fifth possible implementation manner of the second aspect, with reference to any one of the second aspect to the fourth possible implementation manner of the second aspect, the Favorite SMS message is displayed on the SMS message Favorites bar in a thumbnail form, and the receiving unit is further configured to receive a third touch operation on a first thumbnail on the SMS message Favorites bar, where the third touch operation is an operation of tapping the first thumbnail, and the display unit is further configured to display complete content of an SMS message corresponding to the first thumbnail on the touchscreen according to the third touch operation.

In a sixth possible implementation manner of the second aspect, with reference to the fifth possible implementation manner of the second aspect, the receiving unit is further configured to receive a fourth touch operation on a second thumbnail on the SMS message Favorites bar, where the fourth touch operation is an operation of touching the second thumbnail and dragging the second thumbnail out of the SMS message Favorites bar, and the mobile terminal further includes a deletion unit configured to delete a Favorites identifier of an SMS message corresponding to the second thumbnail from the storage space of the mobile terminal according to the fourth touch operation, and cancel displaying of the second thumbnail on the SMS message Favorites bar.

According to a third aspect, an embodiment of the present disclosure provides a mobile terminal, where the mobile terminal includes a touchscreen, a memory, and a processor, an SMS message interaction interface of the mobile terminal includes a recipient name, an SMS message text box, and an SMS message Favorites bar, and the SMS message Favorites bar includes a Favorites button, where the touchscreen is configured to receive a touch operation and display, under control of the processor, an image. The memory is configured to store data. The processor is configured to receive a first touch operation on the SMS message button using the touchscreen, and the processor is further configured to obtain a Favorite SMS message from the memory according to the received first touch operation, and display the obtained Favorite SMS message on the touchscreen.

In a first possible implementation manner of the third aspect, with reference to the third aspect, the SMS message Favorites bar is located at a top of the SMS message interaction interface, or located at a bottom of the SMS message interaction interface, or located at one side of the SMS message interaction interface.

In a second possible implementation manner of the third aspect, with reference to the third aspect or the first possible implementation manner of the third aspect, the SMS message interaction interface further includes a historical SMS message of the mobile terminal, and the historical SMS message is an SMS message received or sent by the mobile terminal before a current moment, and the processor is further configured to receive a second touch operation on a historical SMS message using the touchscreen, where the second touch operation is an operation of touching the historical SMS message and dragging the historical SMS message to the SMS message Favorites bar, and mark the historical SMS message as a Favorite SMS message according to the second touch operation.

In a third possible implementation manner of the third aspect, with reference to any one of the third aspect to the second possible implementation manner of the third aspect, the processor is further configured to display the obtained Favorite SMS message on a Favorites interface according to a time when the SMS message is generated, or a content length of the SMS message, or a recipient name corresponding to the SMS message, where the Favorites interface is a part of the SMS message interaction interface, or the Favorites interface covers the SMS message interaction interface, or the Favorites interface is independent of the SMS message interaction interface.

In a fourth possible implementation manner of the third aspect, with reference to the third possible implementation manner of the third aspect, the Favorites interface includes a search box, and the processor is further configured to obtain information about a recipient entered to the search box, and display an SMS message corresponding to the recipient on the Favorites interface.

In a fifth possible implementation manner of the third aspect, with reference to any one of the third aspect to the fourth possible implementation manner of the third aspect, the Favorite SMS message is displayed on the SMS message Favorites bar in a thumbnail form, and the processor is further configured to receive a third touch operation on a first thumbnail on the SMS message Favorites bar using the touchscreen, where the third touch operation is an operation of tapping the first thumbnail, and display complete content of an SMS message corresponding to the first thumbnail on the touchscreen according to the third touch operation.

In a sixth possible implementation manner of the third aspect, with reference to the fifth possible implementation manner of the third aspect, the processor is further configured to receive a fourth touch operation on a second thumbnail on the SMS message Favorites bar using the touchscreen, where the fourth touch operation is an operation of touching the second thumbnail and dragging the second thumbnail out of the SMS message Favorites bar, and delete a Favorites identifier of an SMS message corresponding to the second thumbnail from storage space of the mobile terminal according to the fourth touch operation, and cancel displaying of the second thumbnail on the SMS message Favorites bar.

It can be known from the above that, the embodiments of the present disclosure provide an SMS message processing method for a mobile terminal and a mobile terminal. The mobile terminal includes a touchscreen. The SMS message interaction interface includes a recipient name, an SMS message text box, and an SMS message Favorites bar, where the SMS message Favorites bar includes a Favorites button. The method includes receiving a first touch operation on the Favorites button, obtaining a Favorite SMS message from storage space of the mobile terminal according to the first touch operation, and displaying the obtained Favorite SMS message on the touchscreen. Therefore, an SMS message Favorites bar is added to an SMS message interaction interface such that when sending, receiving, or viewing an SMS message, a user may tap the SMS message Favorites bar on the current user SMS message interaction interface and view a record of historical SMS messages of the user such that when sending, receiving, or viewing an SMS message, the user can view a Favorite SMS message without performing switching between SMS message interfaces, which resolves a problem that in an existing SMS message sending, receiving, or viewing process, switching needs to be repeatedly performed between user interfaces to view content of a Favorite SMS message, which causes relatively bad user experience.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
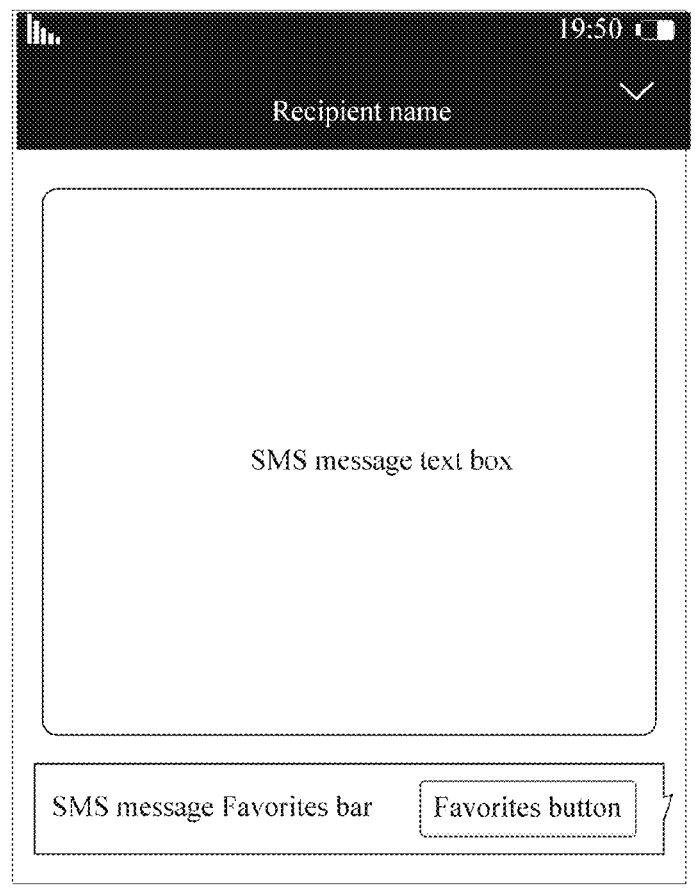
FIG. 1 shows an SMS message interaction interface according to an embodiment of the present disclosure.

Embodiments of the present disclosure provide an SMS message processing method, which is applicable to an SMS message interaction interface of a mobile terminal. The mobile terminal may be a terminal device such as a mobile phone, a tablet computer, a notebook computer, an ultra-mobile personal computer (UMPC), a netbook, or a personal digital assistant (PDA). As shown in FIG. 1, the SMS message interaction interface includes a recipient name, an SMS message text box, and an SMS message Favorites bar. The SMS message Favorites bar includes a Favorites button. It should be noted that, the SMS message Favorites bar is a function bar newly added to the existing SMS message interaction interface and corresponds to an SMS message stored in the mobile terminal. The following describes, using specific embodiments, the SMS message processing method applied to the SMS message interaction interface shown in FIG. 1.

Embodiment 1

Figure 2:
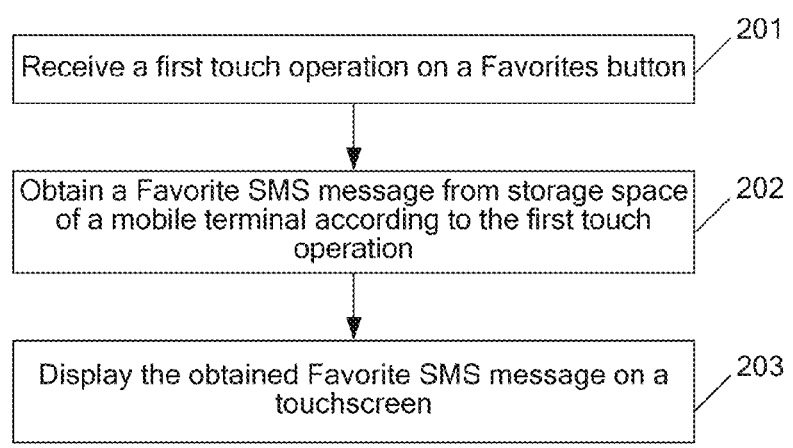
FIG. 2 is a flowchart of an SMS message processing method for a mobile terminal according to an embodiment of the present disclosure.

FIG. 2 is a flowchart of an SMS message processing method for a mobile terminal according to an embodiment of the present disclosure. As shown in FIG. 2, the method may include the following steps.

Step 201: Receive a first touch operation on the Favorites button.

If it is detected that the Favorites button on an SMS message Favorites bar is tapped, or it is detected that time for which the Favorites button is touched is greater than or equal to a preset time threshold, it is determined that a user initiates the first touch operation on the Favorites button.

The preset time threshold may be set according to a need, which is not limited in this embodiment of the present disclosure.

Step 202: Obtain a Favorite SMS message from storage space of the mobile terminal according to the first touch operation.

The user may add a received or sent SMS message to Favorites according to a need. The Favorite SMS message may be marked as "Favorite" and stored in the mobile terminal.

Step 203: Display the obtained Favorite SMS message on the touchscreen.

In this embodiment of the present disclosure, locations of an SMS message text box and the SMS message Favorites bar on an SMS message interaction interface can be properly adjusted according to sizes of the SMS message text box and the SMS message Favorites bar on the SMS message interaction interface. For example, the SMS message Favorites bar may be located at a top of the SMS message interaction interface, or the SMS message Favorites bar may be located at a bottom of the SMS message interaction interface, or the SMS message Favorites bar may be located at one side of the SMS message interaction interface.

Figure 3:
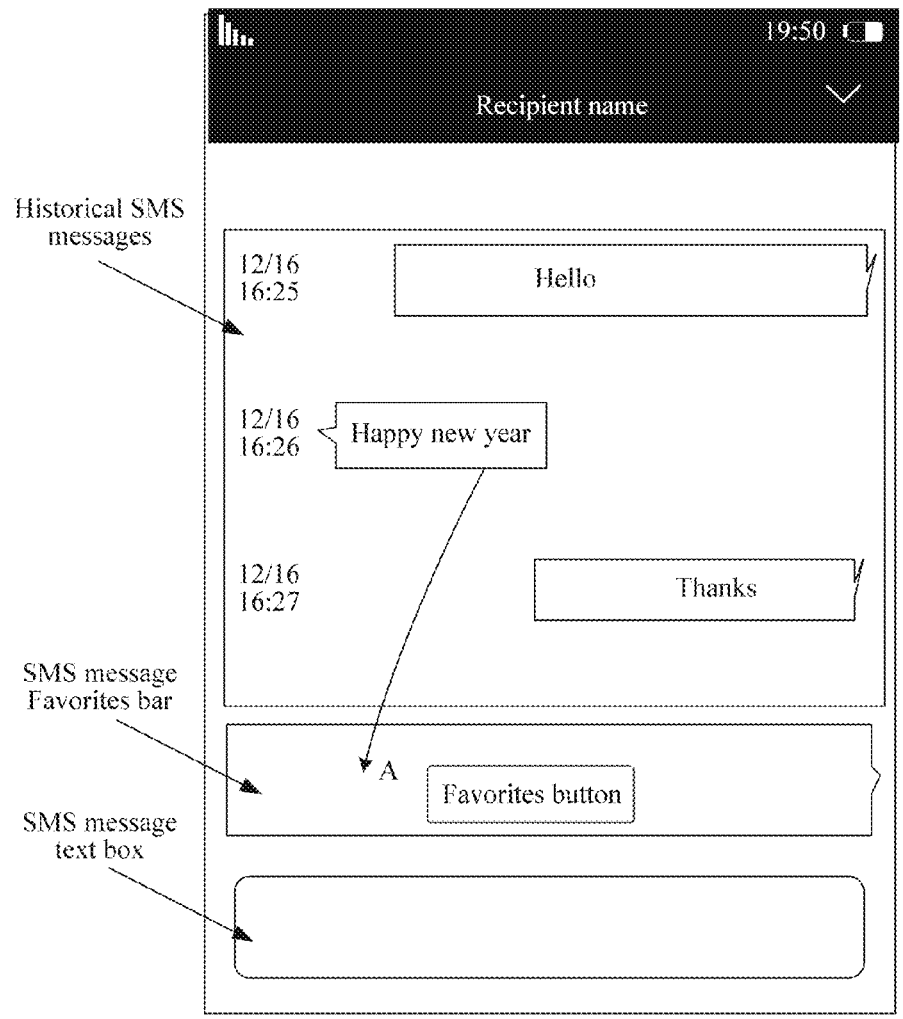
FIG. 3 shows an SMS message interaction interface according to an embodiment of the present disclosure.

In this embodiment of the present disclosure, it may be further implemented that a historical SMS message is added to Favorites on a current SMS message interaction interface in a shortcut manner. As shown in FIG. 3, the SMS message interaction interface further includes the historical SMS message of the mobile terminal, and the historical SMS message may be an SMS message received or sent by the mobile terminal before a current moment. The method may further include receiving a second touch operation on a historical SMS message, where the second touch operation is an operation of touching the historical SMS message and dragging the historical SMS message to the SMS message Favorites bar, which is shown using an arrow A in FIG. 3, and marking the historical SMS message as a Favorite SMS message according to the second touch operation.

Further, in step 203, the obtained Favorite SMS message may be displayed on a Favorites interface according to a time when the SMS message is generated, or a content length of the SMS message, or a recipient name corresponding to the SMS message.

Figure 4A:
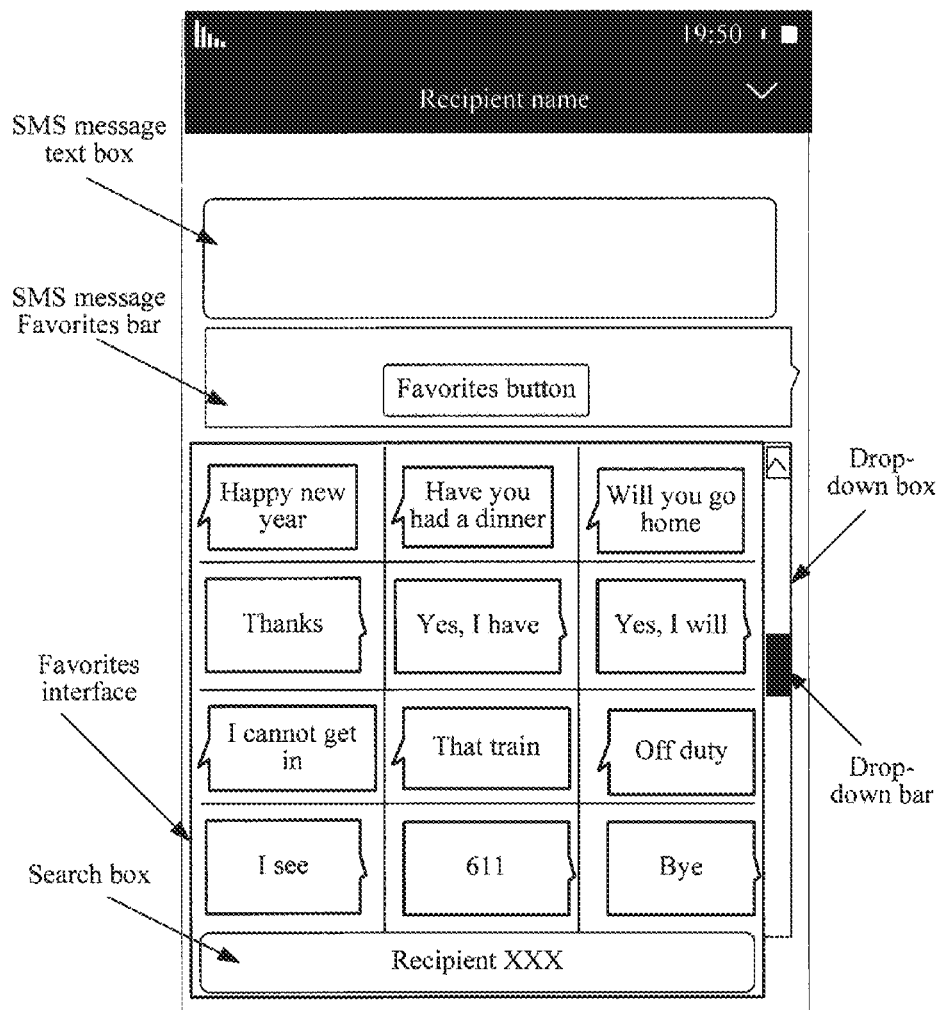
FIG. 4A shows an SMS message interaction interface according to an embodiment of the present disclosure.
Figure 4B:
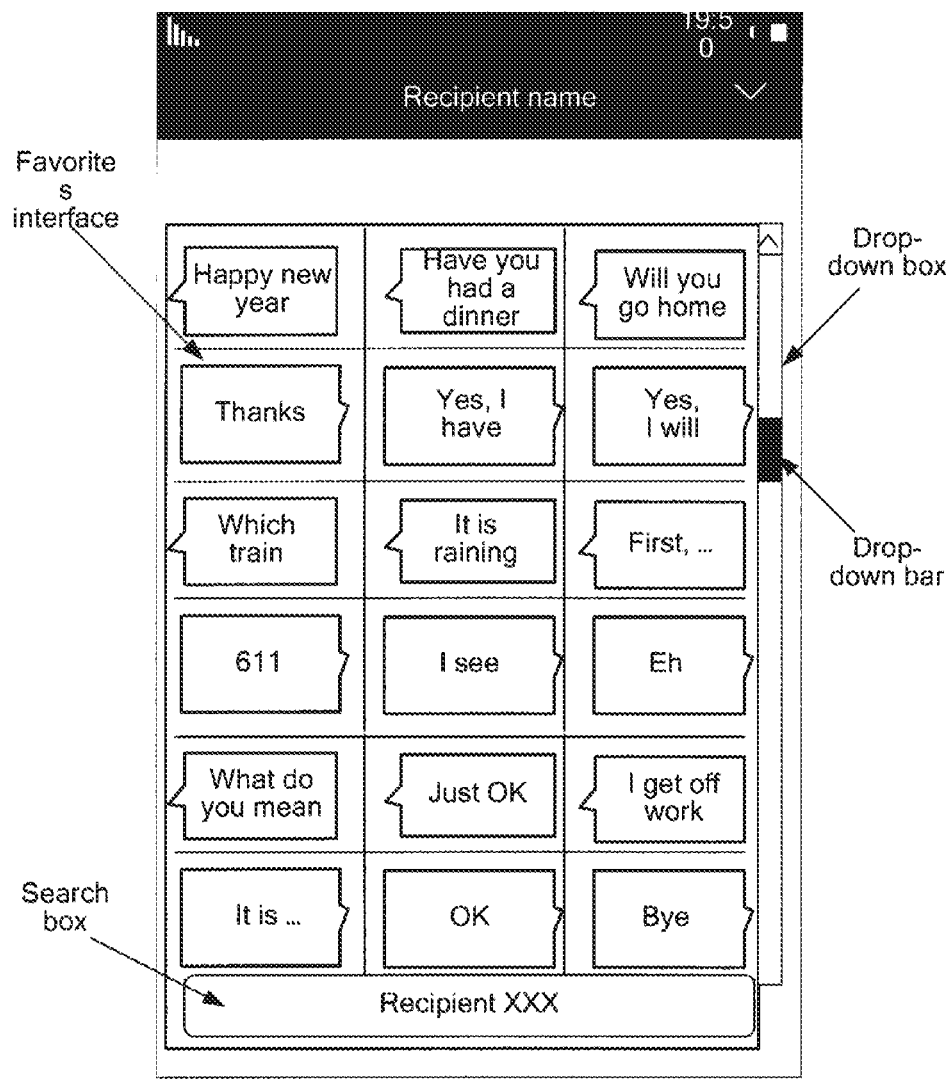
FIG. 4B shows an SMS message interaction interface according to an embodiment of the present disclosure.

The Favorites interface may be a part of the SMS message interaction interface, which is shown in FIG. 4A, or may cover the SMS message interaction interface, which is shown in FIG. 4B, or may be independent of the SMS message interaction interface. In addition, because the Favorites interface is limited, when Favorite SMS messages are relatively large in quantity, the Favorites interface cannot completely display all the SMS messages. Therefore, to ensure that the user can view content of all the SMS messages, as shown in FIG. 4A and FIG. 4B, one side of the Favorites interface includes a drop-down box, and the drop-down box includes a drop-down bar such that the user pulls the drop-down bar and performs tapping to view the SMS messages one by one. It should be noted that, the Favorites interface may not include a drop-down box and a drop-down bar. When wanting to view an SMS message that is not displayed on a current page, the user may directly slide a screen downward, upward, to left, or to right.

Further, to display an SMS message related to only one recipient on the Favorites interface, as shown in FIG. 4A and FIG. 4B, the Favorites interface may include a search box. The method may further include obtaining information about a recipient entered to the search box, and displaying a Favorite SMS message corresponding to the recipient on the Favorites interface.

Figure 5:
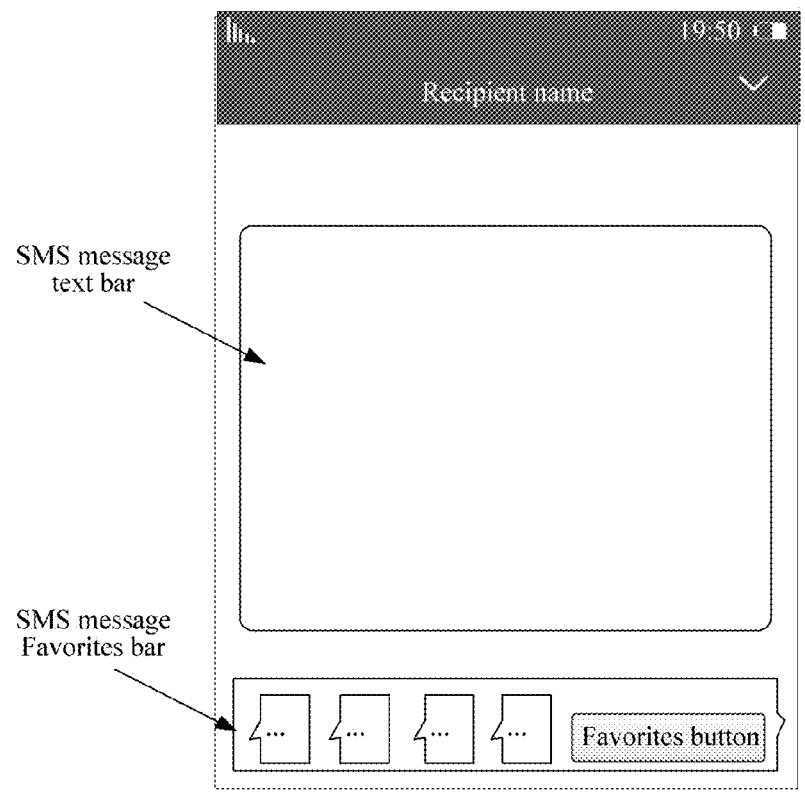
FIG. 5 shows an SMS message interaction interface according to an embodiment of the present disclosure.

Further, as shown in FIG. 5, in this embodiment of the present disclosure, according to a habitual need of the user, the Favorite SMS message preferentially viewed may be further displayed on the SMS message Favorites bar in a thumbnail form such that the user accordingly processes an SMS message corresponding to the thumbnail, which is implemented as follows. Receiving a third touch operation on a first thumbnail on the SMS message Favorites bar, where the third touch operation is an operation of tapping the first thumbnail, and displaying complete content of an SMS message corresponding to the first thumbnail on the touchscreen according to the third touch operation.

Alternatively, in this embodiment of the present disclosure, the Favorite SMS message may be further deleted from Favorites, and a thumbnail is deleted from the SMS message Favorites bar, which may be implemented as follows. Receiving a fourth touch operation on a second thumbnail on the SMS message Favorites bar, where the fourth touch operation is an operation of touching the second thumbnail and dragging the second thumbnail out of the SMS message Favorites bar, deleting a Favorites identifier of an SMS message corresponding to the second thumbnail from the storage space of the mobile terminal according to the fourth touch operation, and cancelling displaying of the second thumbnail on the SMS message Favorites bar.

According to a preset policy, N SMS messages may be selected from the Favorite SMS message, N thumbnails corresponding to the N SMS messages are displayed in the SMS message Favorites bar, and a size of an area occupied by the N thumbnails is less than or equal to a size of an area of the SMS message Favorites bar, where N is a positive integer.

The preset policy may be a time when the SMS message is generated, a content length of the SMS message, or a recipient name corresponding to the SMS message. Specific content on how to perform selection may be set according to a need of the user, which is not limited in this embodiment of the present disclosure.

It can be known from the above that, according to an SMS message processing method for a mobile terminal according to this embodiment of the present disclosure, an SMS message Favorites bar is added to an SMS message interaction interface such that when sending, receiving, or viewing an SMS message, a user may tap the SMS message Favorites bar on the current user SMS message interaction interface and view a record of historical SMS messages of the user such that when sending, receiving, or viewing an SMS message, the user can view a Favorite SMS message without performing switching between SMS message interfaces, which resolves a problem that in an existing SMS message sending, receiving, or viewing process, switching needs to be repeatedly performed between user interfaces to view content of a Favorite SMS message, which causes complexity of an operation.

Embodiment 2

Figure 6:
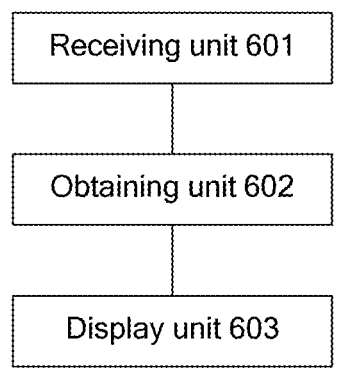
FIG. 6A is a structural diagram of a mobile terminal according to an embodiment of the present disclosure.
FIG. 6B is a structural diagram of a mobile terminal according to an embodiment of the present disclosure.
FIG. 6C is a structural diagram of a mobile terminal according to an embodiment of the present disclosure.
Figure 6A:
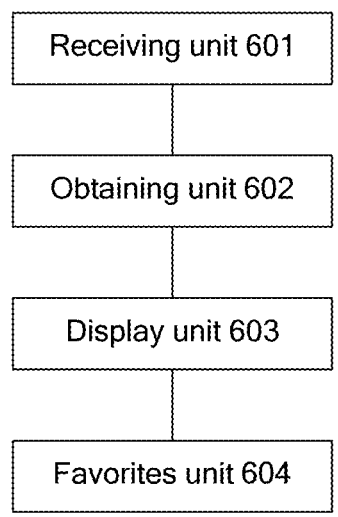
Figure 6A:
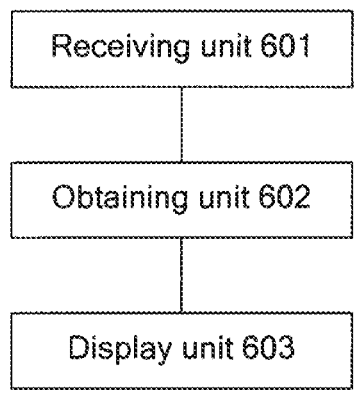

FIG. 6A is a structural diagram of a mobile terminal according to an embodiment of the present disclosure. The mobile terminal includes a touchscreen. An SMS message interaction interface of the mobile terminal includes a recipient name, an SMS message text box, and an SMS message Favorites bar. The SMS message Favorites bar includes a Favorites button. As shown in FIG. 6A, the mobile terminal may further include a receiving unit 601 configured to receive a first touch operation on the SMS message button, an obtaining unit 602 configured to obtain a Favorite SMS message from storage space of the mobile terminal according to the first touch operation received by the receiving unit 601, and a display unit 603 configured to display, on the touchscreen, the Favorite SMS message obtained by the obtaining unit 602.

Further, in this embodiment of the present disclosure, locations of the SMS message text box and the SMS message Favorites bar on the SMS message interaction interface can be properly adjusted according to sizes of the SMS message text box and the SMS message Favorites bar on the SMS message interaction interface. The SMS message Favorites bar is located at a top of the SMS message interaction interface, a bottom of the SMS message interaction interface, or at one side of the SMS message interaction interface.

The receiving unit 601 is further configured to determine that the user initiates the first touch operation on the SMS message Favorites bar if it is detected that time for which the user touches a location of the SMS message Favorites bar is greater than or equal to a preset time threshold, or determine that the user initiates the first touch operation on the SMS message Favorites bar if it is detected that the SMS message Favorites bar is tapped.

The preset time threshold may be set according to a need, which is not limited in this embodiment of the present disclosure.

Further, in this embodiment of the present disclosure, it may be further implemented that a historical SMS message of the mobile terminal is added to Favorites on a current SMS message interaction interface in a shortcut manner. The SMS message interaction interface further includes the historical SMS message of the mobile terminal, and the historical SMS message is an SMS message received or sent by the mobile terminal before a current moment.

The receiving unit 601 is further configured to receive a second touch operation on a historical SMS message, where the second touch operation is an operation of touching the historical SMS message and dragging the historical SMS message to the SMS message Favorites bar.

Figure 6B:
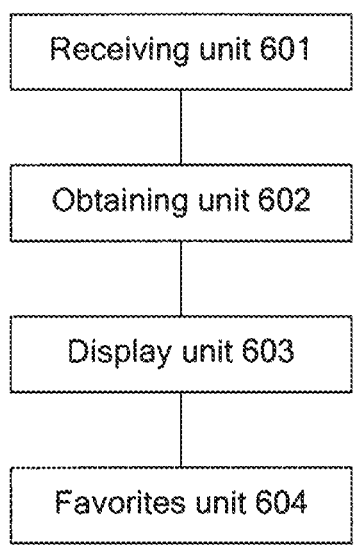

Correspondingly, as shown in FIG. 6B, with respect to the FIG. 6A, the mobile terminal further includes a Favorites unit 604 configured to mark the historical SMS message as a Favorite SMS message according to the second touch operation.

The display unit 603 is further configured to display the obtained Favorite SMS message on a Favorites interface according to a time when the SMS message is generated, a content length of the SMS message, or a recipient name corresponding to the SMS message, where the Favorites interface is a part of the SMS message interaction interface, or the Favorites interface covers the SMS message interaction interface, or the Favorites interface is independent of the SMS message interaction interface.

The Favorites interface may be a part of the SMS message interaction interface, which is shown in FIG. 4A, may cover the SMS message interaction interface, which is shown in FIG. 4B, or may be independent of the SMS message interaction interface. In addition, because the Favorites interface is limited, when Favorite SMS messages are relatively large in quantity, the Favorites interface cannot completely display all the SMS messages. Therefore, to ensure that the user can view content of all the SMS messages, as shown in FIG. 4A and FIG. 4B, one side of the Favorites interface includes a drop-down box, and the drop-down box includes a drop-down bar such that the user pulls the drop-down bar and performs tapping to view the SMS messages one by one.

Further, to display an SMS message related to only one recipient on the Favorites interface, as shown in FIG. 4A and FIG. 4B, the Favorites interface includes a search box.

Correspondingly, the receiving unit 601 is further configured to obtain information about a recipient entered to the search box, and the display unit 603 is further configured to display an SMS message corresponding to the recipient on the Favorites interface.

As shown in FIG. 5, in this embodiment of the present disclosure, according to a habitual need of the user, content of the Favorite SMS message preferentially viewed may be further displayed on the SMS message Favorites bar in a thumbnail form such that the user accordingly taps and touches a thumbnail and processes an SMS message corresponding to the thumbnail.

Correspondingly, the receiving unit 601 is further configured to receive a third touch operation on a first thumbnail on the SMS message Favorites bar, where the third touch operation is an operation of tapping the first thumbnail, and the display unit 603 is further configured to display complete content of an SMS message corresponding to the first thumbnail on the touchscreen according to the third touch operation.

According to a preset policy, N SMS messages may be selected from the Favorite SMS message, N thumbnails corresponding to the N SMS messages are displayed in the SMS message Favorites bar, and a size of an area occupied by the N thumbnails is less than or equal to a size of an area of the SMS message Favorites bar, where N is a positive integer.

The preset policy may be according to a time when the SMS message is generated, a content length of the SMS message, or a recipient name corresponding to the SMS message. Specific content on how to perform selection may be set according to a need of the user, which is not limited in this embodiment of the present disclosure.

The receiving unit 601 is further configured to receive a fourth touch operation on a second thumbnail on the SMS message Favorites bar, where the fourth touch operation is an operation of touching the second thumbnail and dragging the second thumbnail out of the SMS message Favorites bar.

Figure 6C:
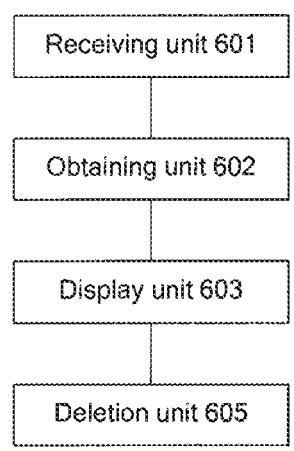

As shown in FIG. 6C, the mobile terminal further includes a deletion unit 605 configured to delete a Favorites identifier of an SMS message corresponding to the second thumbnail from the storage space of the mobile terminal according to the fourth touch operation, and cancel displaying of the second thumbnail on the SMS message Favorites bar.

It can be known from the above that, this embodiment of the present disclosure provides a mobile terminal. The mobile terminal is configured to implement the method process provided in the foregoing method embodiment. For details of a working principle and a working process of the mobile terminal, refer to description in the foregoing method embodiment. An SMS message Favorites bar is added to an SMS message interaction interface such that when sending, receiving, or viewing an SMS message, a user may tap the SMS message Favorites bar on the current user SMS message interaction interface and view a record of historical SMS messages of the user such that when sending, receiving, or viewing an SMS message, the user can view a Favorite SMS message without performing switching between SMS message interfaces, which resolves a problem that in an existing SMS message sending, receiving, or viewing process, switching needs to be repeatedly performed between user interfaces to view content of a Favorite SMS message, which causes complexity of an operation.

Embodiment 3

Figure 7:
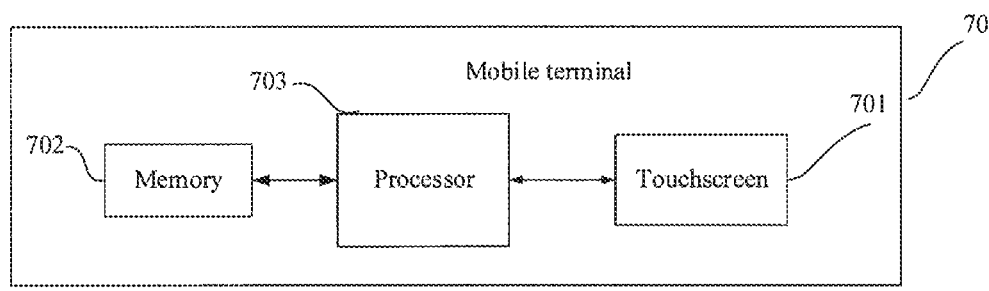
FIG. 7 is a structural diagram of a mobile terminal according to an embodiment of the present disclosure.

FIG. 7 is a structural diagram of a mobile terminal 70 according to an embodiment of the present disclosure. The mobile terminal 70 provided in this embodiment of the present disclosure may be configured to implement the method shown in the foregoing method embodiment. For ease of description, only a part related to this embodiment of the present disclosure is shown, and for undisclosed specific technical details, refer to description in the foregoing method embodiment.

The mobile terminal 70 may be a mobile phone, a tablet computer, a notebook computer, a UMPC, a netbook, a PDA, or the like. FIG. 7 is a block diagram of a partial structure of a mobile terminal 70 related to each embodiment of the present disclosure.

As shown in FIG. 7, the mobile terminal 70 includes components such as a touchscreen 701, a memory 702, and a processor 703. A person skilled in the art may understand that the structure of the mobile terminal 70 shown in FIG. 7 does not constitute any limitation on the mobile terminal 70, and the mobile terminal 70 may include more components than those shown in the FIG. 7, or some components may be combined, or a different component deployment may be used.

The following further describes the components of the mobile terminal 70 with reference to FIG. 7. The touchscreen 701 is referred to as a touch display panel configured to implement input and output functions of the mobile terminal 70. The touchscreen 701 may collect touch operations of a user on or near the touchscreen 701, for example, an operation performed by the user on the touchscreen 701 or near the touchscreen 701 using any suitable object or accessory such as a finger or a stylus, and drive a corresponding connection apparatus according to a preset program, and may be further configured to display information entered by the user or information provided to the user and various menus in the mobile terminal 70. Optionally, the touchscreen 701 may include two parts, a touch detection apparatus and a touch controller. The touch detection apparatus detects a touch direction and position of the user, detects a signal caused by the touch operation, and transmits the signal to the touch controller. The touch controller receives touch information from the touch detection apparatus, converts the touch information into contact coordinates, then transmits the contact coordinates to the processor 703, and can receive a command sent by the processor 703 and execute the command. When detecting the touch operation on or near the touchscreen 701, the touchscreen 701 transmits a touch event to the processor 703 to determine a type of the touch event. Subsequently, the processor 703 provides corresponding visual output on a display screen 701 according to the type of the touch event. In addition, the touchscreen 701 may be implemented in various types such as resistance-type, capacitance-type, infrared, and surface acoustic wave.

The memory 702 may be configured to store data, a software program, and a module, and mainly include a program storage area and a data storage area. The program storage area may store an operating system, an application program required by at least one function, such as a sound playback function and an image playback function, and the like. The data storage area may store data, such as audio data, image data, and a phone book created according to use of the mobile terminal 70. In addition, the memory 702 may include a high-speed random access memory (RAM), and may also include a non-volatile memory such as at least one disk storage device, a flash memory device, or another volatile solid-state storage device.

The processor 703 is a control center of the mobile terminal 70, and is connected to various parts of the whole mobile terminal 70 using various interfaces and lines. By running or executing the software program and/or module stored in the memory 702, and invoking the data stored in the memory 702, the processor 703 performs various functions and data processing of the mobile terminal 70, thereby performing overall monitoring on the mobile terminal 70. Optionally, the processor 703 may include one or more processing units. Preferably, the processor 703 may be integrated with an application processor and a modem processor. The application processor mainly processes an operating system, a user interface, an application program, and the like. The modem processor mainly processes wireless communication. It may be understood that the foregoing modem processor may be not integrated into the processor 703.

Although not shown, the mobile terminal 70 may further include a WI-FI module, a BLUETOOTH module, a power supply, for example, a battery for supplying power to each component, and the like, and details are not described herein.

In this embodiment of the present disclosure, the processor 703 is further configured to receive a first touch operation on the SMS message button using the touchscreen 701, obtain a Favorite SMS message from the memory 702 of the mobile terminal 70 according to the received first touch operation, and display, on the touchscreen 701, the Favorite SMS message obtained by the memory 702.

In this embodiment of the present disclosure, locations of an SMS message text box and an SMS message Favorites bar on an SMS message interaction interface can be properly adjusted according to sizes of the SMS message text box and the SMS message Favorites bar on the SMS message interaction interface. The SMS message Favorites bar is located at a top of the SMS message interaction interface, or located at a bottom of the SMS message interaction interface, or located at one side of the SMS message interaction interface.

The processor 703 is further configured to determine that the user initiates the first touch operation on the SMS message Favorites bar if it is detected that time for which the user touches a location of the SMS message Favorites bar is greater than or equal to a preset time threshold. The preset time threshold may be set according to a need, which is not limited in this embodiment of the present disclosure.

In this embodiment of the present disclosure, it may be further implemented that a historical SMS message of the mobile terminal is added to Favorites on a current SMS message interaction interface in a shortcut manner. The SMS message interaction interface further includes the historical SMS message of the mobile terminal 70, and the historical SMS message is an SMS message received or sent by the mobile terminal 70 before a current moment. The processor 703 is further configured to receive a second touch operation on a historical SMS message using the touchscreen 701, where the second touch operation is an operation of touching the historical SMS message and dragging the historical SMS message to the SMS message Favorites bar, and mark the historical SMS message as a Favorite SMS message according to the second touch operation.

The processor 703 is further configured to display the obtained Favorite SMS message on a Favorites interface according to a time when the SMS message is generated, a content length of the SMS message, or a recipient name corresponding to the SMS message.

The Favorites interface may be a part of the SMS message interaction interface (which is shown in FIG. 4A), or may cover the SMS message interaction interface (which is shown in FIG. 4B), or may be independent of the SMS message interaction interface. In addition, because the Favorites interface is limited, when Favorite SMS messages are relatively large in quantity, the Favorites interface cannot completely display all the SMS messages. Therefore, to ensure that the user can view content of all the SMS messages, as shown in FIG. 4A and FIG. 4B, one side of the Favorites interface includes a drop-down box, and the drop-down box includes a drop-down bar such that the user pulls the drop-down bar and performs tapping to view the SMS messages one by one.

Further, in order to display an SMS message related to only one recipient on the Favorites interface, as shown in FIG. 4A and FIG. 4B, the Favorites interface includes a search box.

Correspondingly, the processor 703 is further configured to obtain, using the touchscreen 701, information about a recipient entered to the search box, and display an SMS message corresponding to the recipient on the Favorites interface.

Further, as shown in FIG. 5, in this embodiment of the present disclosure, according to a habitual need of the user, content of the Favorite SMS message preferentially viewed may be further displayed on the SMS message Favorites bar in a thumbnail form such that the user accordingly taps and touches a thumbnail and processes an SMS message corresponding to the thumbnail.

Correspondingly, the processor 703 is further configured to receive a third touch operation on a first thumbnail on the SMS message Favorites bar using the touchscreen 701, where the third touch operation is an operation of tapping the first thumbnail, and display complete content of an SMS message corresponding to the first thumbnail on the touchscreen 701 according to the third touch operation.

According to a preset policy, N SMS messages may be selected from the Favorite SMS message, N thumbnails corresponding to the N SMS messages are displayed in the SMS message Favorites bar, and a size of an area occupied by the N thumbnails is less than or equal to a size of an area of the SMS message Favorites bar, where N is a positive integer.

Selecting, according to a preset policy, N SMS messages from the Favorite SMS message may be preferentially selecting N SMS messages according to a time when the SMS message is generated, or a content length of the SMS message, or a recipient name corresponding to the SMS message. Specific content on how to perform selection may be set according to a need of the user, which is not limited in this embodiment of the present disclosure.

The processor 703 is further configured to receive a fourth touch operation on a second thumbnail on the SMS message Favorites bar using the touchscreen 701, where the fourth touch operation is an operation of touching the second thumbnail and dragging the second thumbnail out of the SMS message Favorites bar, and delete a Favorites identifier of an SMS message corresponding to the second thumbnail from storage space of the mobile terminal 70 according to the fourth touch operation, and cancel displaying of the second thumbnail on the SMS message Favorites bar.

It can be known from the above that, this embodiment of the present disclosure provides a mobile terminal 70. An SMS message Favorites bar is added to an SMS message interaction interface such that when sending, receiving, or viewing an SMS message, a user may tap the SMS message Favorites bar on the current user SMS message interaction interface and view a record of historical SMS messages of the user such that when sending, receiving, or viewing an SMS message, the user can view a Favorite SMS message without performing switching between SMS message interfaces, which resolves a problem that in an existing SMS message sending, receiving, or viewing process, switching needs to be repeatedly performed between user interfaces to view content of a Favorite SMS message, which causes complexity of an operation.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A short message service (SMS) message processing method for a mobile terminal, comprising:
   displaying, by the mobile terminal, an SMS message interaction interface on a touchscreen of the mobile terminal, wherein the SMS message interaction interface comprises a recipient name, an SMS message text box, and an SMS message Favorites bar, and wherein the SMS message Favorites bar comprises a Favorites button;
   receiving, by the mobile terminal, a first touch operation on the Favorites button at a current moment;
   obtaining, by the mobile terminal, a Favorite SMS message comprising historical SMS messages from a storage space of the mobile terminal according to the first touch operation, wherein the obtained Favorite SMS message from the storage space comprises a first historical SMS message received from a first recipient at the mobile terminal before the current moment;
   displaying, by the mobile terminal, the obtained Favorite SMS message on the touchscreen;
   receiving, by the mobile terminal, a second touch operation on a second historical SMS message, wherein the second touch operation is an operation of touching the second historical SMS message and dragging the second historical SMS message to the SMS message Favorites bar; and
   marking, by the mobile terminal, the second historical SMS message as a Favorite SMS message according to the second touch operation.

2. The SMS message processing method according to claim 1, wherein the obtained Favorite SMS message further comprises a third historical SMS message sent to the first recipient from the mobile terminal before the current moment.

3. The SMS message processing method according to claim 1, wherein displaying the obtained Favorite SMS message on the touchscreen comprises displaying, by the mobile terminal, the obtained Favorite SMS message corresponding to the first recipient on a Favorites interface, and wherein the Favorites interface is a part of the SMS message interaction interface.

4. The SMS message processing method according to claim 1, wherein the SMS message Favorites bar is located at a bottom of the SMS message interaction interface.

5. The SMS message processing method according to claim 1, wherein the SMS message Favorites bar is located at one side of the SMS message interaction interface.

6. The SMS message processing method according to claim 1, wherein displaying the obtained Favorite SMS message on the touchscreen comprises displaying the obtained Favorite SMS message corresponding to the first recipient on a Favorites interface, and wherein the Favorites interface covers the SMS message interaction interface.

7. The SMS message processing method according to claim 1, wherein displaying the obtained Favorite SMS message on the touchscreen comprises displaying the obtained Favorite SMS message corresponding to the first recipient on a Favorites interface, and wherein the Favorites interface is independent of the SMS message interaction interface.

8. A mobile terminal, comprising:
a touchscreen;
a memory coupled to the touchscreen, wherein the memory comprises instructions; and
a processor coupled to the memory and the touchscreen, wherein the touchscreen is configured to:
receive a touch operation; and
display, under control of the processor, an image, wherein the memory is configured to store data, and
wherein the instructions are executed by the processor and cause the mobile terminal to be configured to:
display a short message service (SMS) message interaction interface on the touchscreen, wherein the SMS message interaction interface comprises a recipient name, an SMS message text box, a Favorites button;
receive a first touch operation on the Favorites button using the touchscreen at a current moment;
obtain a Favorite SMS message from the memory according to the received first touch operation, wherein the obtained Favorite SMS message from the memory comprises a first historical SMS message received from a first recipient at the mobile terminal before the current moment;
display the obtained Favorite SMS message on the touchscreen;
receive a second touch operation on a second historical SMS message, wherein the second touch operation is an operation of touching the second historical SMS message and dragging the second historical SMS message to a SMS message Favorites bar; and
mark the second historical SMS message as a Favorite SMS message according to the second touch operation.

9. The mobile terminal according to claim 8, wherein an SMS message Favorites bar comprises the Favorites button, and wherein the SMS message Favorites bar is located at a top of the SMS message interaction interface.

10. The mobile terminal according to claim 8, wherein the obtained Favorite SMS message further comprises a third historical SMS message sent to a second recipient before the current moment.

11. The mobile terminal according to claim 8, wherein an SMS message Favorites bar comprises the Favorites button, and wherein the SMS message Favorites bar is located at a bottom of the SMS message interaction interface.

12. The mobile terminal according to claim 8, wherein an SMS message Favorites bar comprises the Favorites button, and wherein the SMS message Favorites bar is located at one side of the SMS message interaction interface.

13. The mobile terminal according to claim 8, wherein the instructions further cause the mobile terminal to be configured to display the obtained Favorite SMS message corresponding to the first recipient on a Favorites interface, and wherein the Favorites interface covers the SMS message interaction interface.

14. The mobile terminal according to claim 8, wherein the instructions further cause the mobile terminal to be configured to display the obtained Favorite SMS message corresponding to the first recipient on a Favorites interface, and wherein the Favorites interface is independent of the SMS message interaction interface.

15. A short message service (SMS) message processing method for a mobile terminal, comprising:
displaying, by the mobile terminal, an SMS message interaction interface on a touchscreen of the mobile terminal, wherein the SMS message interaction interface comprises a recipient name, an SMS message text box, and a Favorites button;
receiving, by the mobile terminal, a first touch operation on the Favorites button at a current moment;
obtaining, by the mobile terminal, a Favorite SMS message from a storage space of the mobile terminal according to the first touch operation, wherein the obtained Favorite SMS message from the storage space comprises a first historical SMS message received from a first recipient at the mobile terminal before the current moment;
displaying, by the mobile terminal, the obtained Favorite SMS message on the touchscreen;
receiving, by the mobile terminal, a second touch operation on a second historical SMS message, wherein the second touch operation is an operation of touching the second historical SMS message and dragging the second historical SMS message to a SMS message Favorites bar; and
marking, by the mobile terminal, the second historical SMS message as a Favorite SMS message according to the second touch operation.

16. The SMS message processing method according to claim 15, wherein displaying the obtained Favorite SMS message on the touchscreen comprises displaying the obtained Favorite SMS message corresponding to the first recipient on a Favorites interface, and wherein the Favorites interface is independent of the SMS message interaction interface.

17. The SMS message processing method according to claim 15, wherein the obtained Favorite SMS message from the storage space further comprises a second historical SMS message sent to a second recipient from the mobile terminal before the current moment.

18. The SMS message processing method according to claim 15, wherein displaying the obtained Favorite SMS message on the touchscreen comprises displaying the obtained Favorite SMS message corresponding to the first recipient on a Favorites interface, and wherein the Favorites interface covers the SMS message interaction interface.

19. The SMS message processing method according to claim 15, wherein displaying the obtained Favorite SMS message on the touchscreen comprises displaying the obtained Favorite SMS message corresponding to the first recipient on a Favorites interface, and wherein the Favorites interface is independent of the SMS message interaction interface.

* * * * *